A. W. F. STECKEL.
LUBRICATOR FOR CHAINS AND THE LIKE.
APPLICATION FILED DEC. 17, 1908.
997,586.
Patented July 11, 1911.
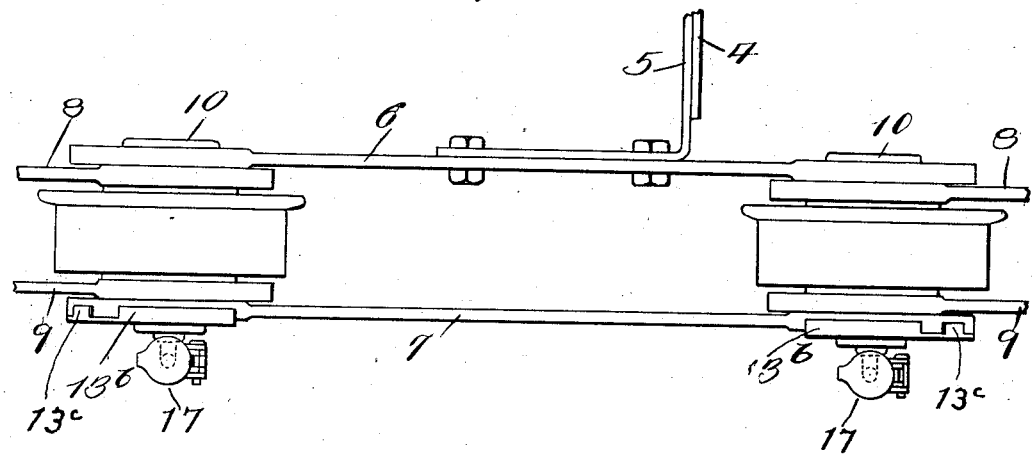
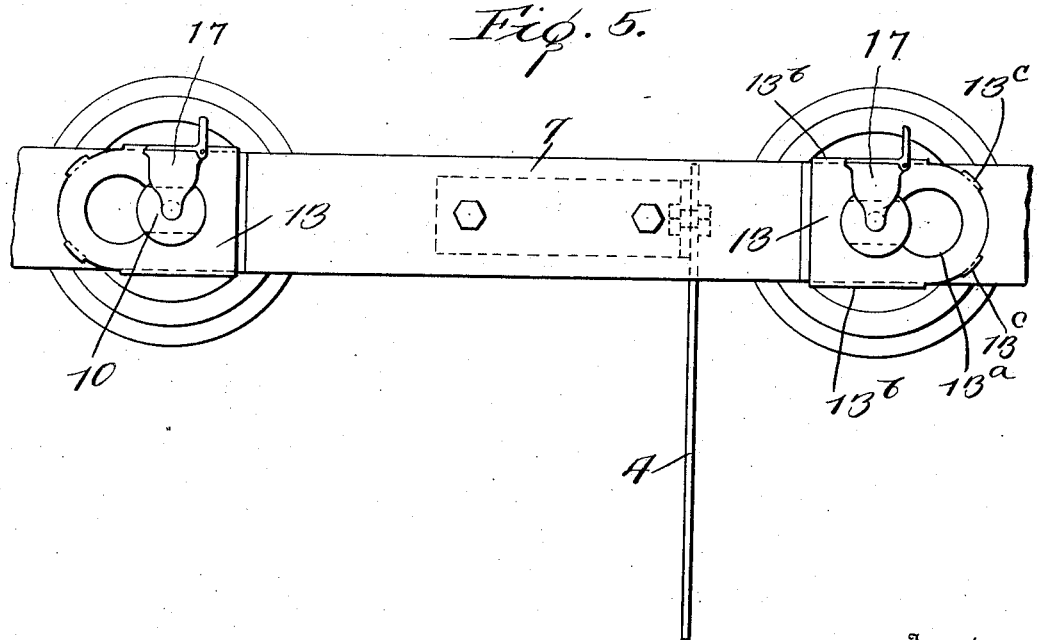

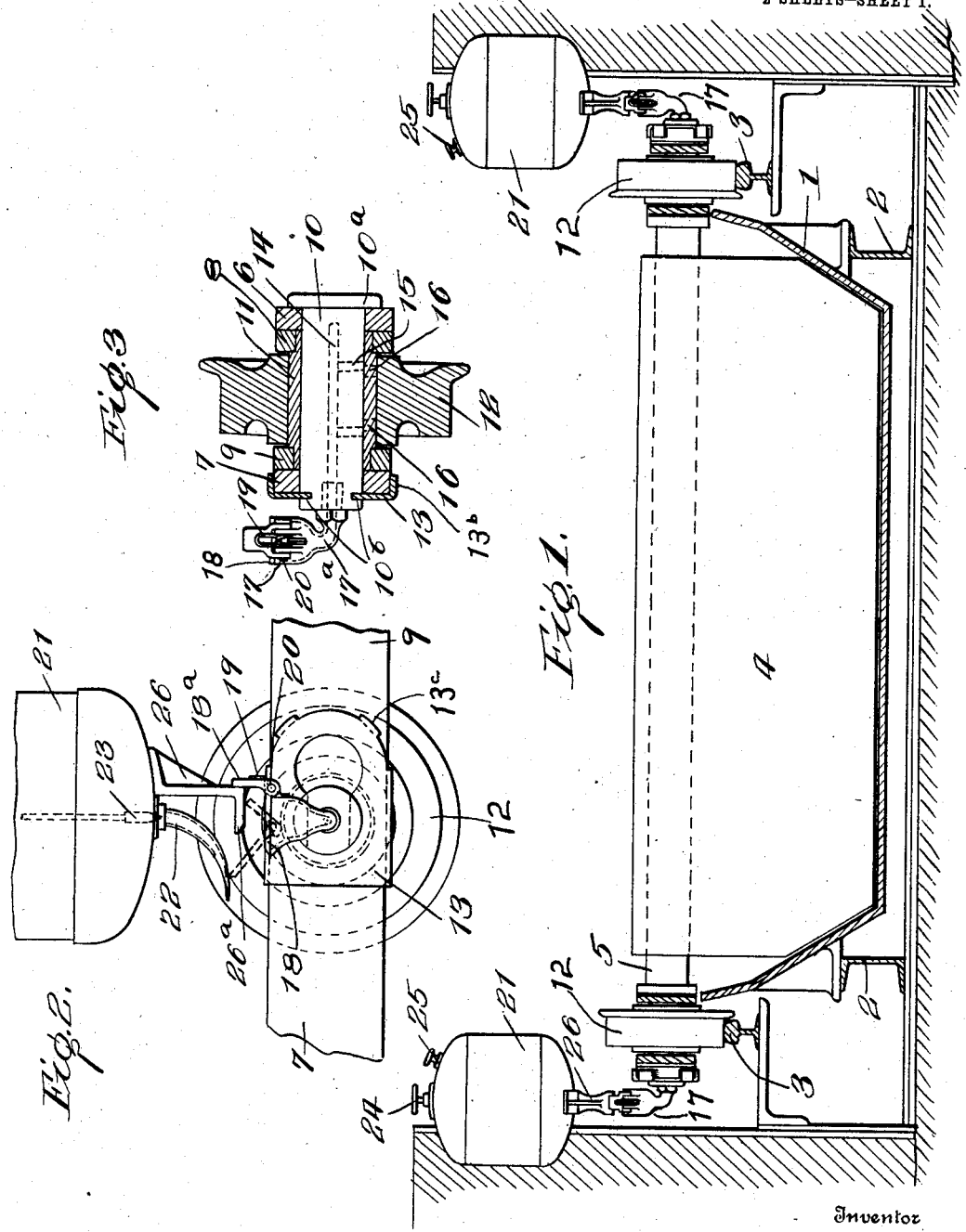

UNITED STATES PATENT OFFICE.

ARCHIBALD W. F. STECKEL, OF COLUMBUS, OHIO, ASSIGNOR TO THE JEFFREY MANUFACTURING COMPANY, OF COLUMBUS, OHIO, A CORPORATION OF OHIO.

LUBRICATOR FOR CHAINS AND THE LIKE.

997,586.  Specification of Letters Patent.  Patented July 11, 1911.

Application filed December 17, 1908. Serial No. 468,046.

*To all whom it may concern:*

Be it known that I, ARCHIBALD W. F. STECKEL, a citizen of the United States, residing at Columbus, in the county of Franklin and State of Ohio, have invented certain new and useful Improvements in Lubricators for Chains and the Like, of which the following is a specification, reference being had therein to the accompanying drawing.

This invention relates particularly to mechanisms in which the parts to be lubricated are bodily movable in operation.

Though not by any means so restricted, the invention is especially applicable to the chains of conveyers, and the like. Accordingly I show and describe my invention as applied to a chain of a conveyer.

In the accompanying drawings, Figure 1 is a transverse section of the conveyer, Fig. 2 is a side elevation of one of the lubricant reservoirs and a portion of the conveyer chain, Fig. 3 is a transverse section through one of the chain pins and track wheels, Fig. 4 is a plan view of a portion of one of the conveyer chains, and Fig. 5 is a side elevation of the chain shown in Fig. 4.

The conveyer shown is of the trough type, but it will be understood that the character of the conveyer is largely immaterial so far as my invention is concerned.

The conveyer trough 1 is supported upon side rails or channels 2, 2, and at either side of the trough are provided track rails 3, 3, by which the wheels of the conveyer are supported and guided.

4 indicates one of a series of scraper plates each of which is mounted upon a cross bar 5 which is secured at either end to one of the two conveyer chains. These chains are alike and the description of one of them as shown in Figs. 3, 4 and 5 will suffice. The alternate links of the chain are made up of outer and inner bars 6, 7 and 8, 9, which bars are pivotally connected by pins 10. A bearing sleeve 11 is mounted upon each of the pins and upon each bearing sleeve is rotatably mounted a track wheel 12, the ends of the links 8, 9, are received upon the shouldered ends of the sleeve 11 while the links 6 and 7 directly engage the pin 10. The inner end of the pin is formed with a head $10^a$ and its outer end is formed with diametrically opposite slots $10^b$ to receive a securing or locking plate 13. This locking plate, which is of well known construction, is formed with a circular opening $13^a$ of a size to receive the pin 10 and having an extension the straight sides of which are adapted to engage the slots $10^b$ of the pin. The locking plate is formed with upper and lower flanges $13^b$ which engage the upper and lower edges of the links 7, and is also formed with lugs $13^c$ which engage the end of link 7. The plate 13 is formed of sheet metal and in assembling the chain, the opening $13^a$ of the plate is passed over the end of the pin, the lugs $13^c$ then being in the plane of the plate, and the plate is then moved longitudinally of the chain bringing the straight edges of the extension of the opening $13^a$ into engagement with the slots $10^b$ of the pin. The lugs $13^c$ are then bent over the end of the link 7 thus securing the pin against displacement.

The foregoing sets forth a well known standard construction, and I now proceed to describe my invention proper which relates to the means for lubricating the bearing surfaces between the pin 10, link bars 6, 7, 8, 9, the sleeve 11 and the track wheel 12. Much difficulty has been encountered heretofore in attempting to secure a satisfactory lubrication of such chains, especially where they constitute a part of conveying devices which are employed to handle dusty and gritty materials. In the first place, it is difficult to insure the application of the lubricant to the working surfaces, and in the second place, the lubricant, if it finds its way to the said surfaces, tends to carry with it dust and gritty material which causes the rapid deterioration of the joints of the chain.

The prime object of this invention is to provide means for conducting the lubricant with certainty to all of the working surfaces which is adapted to prevent the entrance of dust or other foreign material along with the lubricant. To this end each of the chain pins 10 is formed with a longitudinal passage 14 and branch passages 15 which radiate therefrom and lead to the bearing surface between the pin and sleeve 11. The sleeve 11 is also formed with perforations 16 which extend from the last named bearing surfaces to the bearing surfaces between the sleeve and track wheel 12. 17 is an oil cup having a neck $17^a$ which is threaded into the end of the pin 10 so as to place the interior of the cup in communication with the axial passage 14 of the pin. The oil cup is provided with a hinged cover 18 which is formed with an up-standing extension or arm 18ª, and a spring 19 which is coiled about the hinge pin 20 of the cover serves to normally hold the cover closed.

As has been stated, the two chains of the conveyer are substantially alike, and as will be seen upon referring to Fig. 1, each of the chains is provided with oil cups as above described. For the purpose of automatically feeding oil to the oil cups, and thence to the bearing surfaces of the chain, the following means are provided: At either side of one of the runs of the conveyer are mounted, on some suitable support, oil reservoirs 21 each of which is provided at its lower side with a discharge spout 22 disposed in the vertical plane of the oil cups. This discharge spout is controlled by a needle valve 23, the stem of which extends through the top of the reservoir and is provided with a hand-wheel 24. The removable screw cap 25 provides facilities for filling the reservoir with lubricant. The spout 22, preferably formed of resilient material, is bent, as shown, in the direction of the movement of the conveyer and preferably has its lower end flattened and the upper wall thereof cut away as is clearly shown in Fig. 2. A bracket 26 is rigidly secured to the bottom of each of the reservoirs 21 in line with its discharge spout 22. This bracket 26 is formed at its lower end with a longitudinally extending foot 26ª and the length of the bracket is such as to bring its lower end in the path of the lugs 18ª of the oil cup covers as the latter advance in the travel of the conveyer.

From the above description, the operation of the lubricating device will readily be understood. The reservoirs 21 having been supplied with suitable lubricant, such as oil, the needle valves are opened sufficiently to allow a slow feed of the oil through the spouts 22, the oil flowing to the lower ends of the spouts and accumulating in the form of drops on the lower surfaces thereof. As the conveyer advances, the lugs 18ª of the oil cup covers engage the brackets 26 thus lifting the covers and as the forward movement continues, the upper ends of the lugs 18ª ride over the lower surfaces of the extensions 26ª of the brackets thus maintaining the covers in their raised or open position, as shown by dotted lines in Fig. 2, and causing the front beveled edges of the oil cup covers to engage the oil spouts 22 and wipe one or more drops of oil therefrom. The oil wiped from the spouts runs down the inner faces of the oil cup covers and thence finds its way into the cups. As soon as the lugs 18ª advance to the front ends of the brackets extensions, the covers are closed by the action of springs 19. The oil once in the cups is retained by the covers which are held firmly shut by the springs 19 and which also serve to exclude all dust from the oil so that the latter flows without contamination to the passages of the chain pins 10 and thence finds its way to all the bearing surfaces. It is obvious, of course, that the oil reservoirs should be mounted at some point in the conveyer system where there is as little dust in suspension in the air as possible so that there will be no opportunity for the oil to be contaminated as it accumulates on the discharge spouts of the reservoir.

Ordinarily but one pair of lubricant reservoirs will be provided so that one or more drops of oil will be introduced into each cup during each traverse of the conveyer, but it is quite obvious that in the case of very long conveyer systems one or more additional pairs of reservoirs might be provided if it were found desirable.

What I claim is:—

1. In a lubricating system, the combination of a moving mechanism, a lubricant cup or receptacle carried by said mechanism, said cup having a normally closed cover, a lubricant reservoir mounted adjacent the path of the said moving mechanism, and means for automatically opening the cover of the lubricant receptacle as the latter passes the said reservoir to receive lubricant therefrom.

2. In a lubricating system, the combination of a moving mechanism, a lubricant cup or receptacle carried by said mechanism, said cup having a normally closed cover, a lubricant reservoir mounted adjacent the path of the said moving mechanism, a lubricant receiving device associated with the reservoir, and means for automatically raising the cup cover into engagement with the said lubricant receiving device to wipe lubricant therefrom and direct it into the cup.

3. In a conveyer or the like, the combination with a chain, of oil cups carried by the chain to feed oil to the bearing surfaces thereof, each of said cups having a normally closed cover, a reservoir mounted adjacent the path of travel of the chain, and means for automatically opening the covers of the oil cups as the latter pass the said reservoir to receive oil therefrom.

4. In a conveyer or the like, the combination of the chain links, pivot pins connecting said links and formed with longitudinal passages and radial passages leading therefrom to the bearing surfaces of the pins, oil cups carried by said chain pins and adapted to feed oil to the passages thereof, each cup having a normally closed cover, an oil reservoir mounted adjacent the path of travel of the chain, and means for automatically opening the covers of the oil cups as the latter pass the said reservoir to receive oil therefrom.

5. In a conveyer or the like, the combination of the chain links, pivot pins connecting said links and formed with longitudinal passages and radial passages leading therefrom to the bearing surfaces of the pins, oil cups carried by said chain pins and adapted to feed oil to the passages thereof, each cup having a normally closed cover, an oil reservoir mounted adjacent the path of travel of the chain, a lubricant receiving device associated with the reservoir, and means for automatically raising the cup covers into engagement with the said lubricant receiving device to wipe lubricant therefrom and direct it into the cups.

6. In a conveyer or the like, the combination with a chain, of oil cups carried by the chain to feed oil to the bearing surfaces thereof, each of said cups having a normally closed cover, an oil reservoir mounted adjacent the path of travel of the chain and provided with a discharge passage, means for controlling the flow of oil through said discharge passage, and means for automatically opening the covers of the oil cups as the latter pass the said reservoir to receive oil therefrom.

7. In a conveyer or the like, the combination of the chain links, pivot pins connecting said links and formed with longitudinal passages and radial passages leading therefrom to the bearing surfaces of the pins, oil cups carried by said chain pins and adapted to feed oil to the passages thereof, each cup having a normally closed cover, an oil reservoir mounted adjacent the path of travel of the chain and having an outlet, an oil receiving device arranged to receive oil from the said reservoir outlet, means for controlling the flow of oil through said outlet, and means for automatically raising the cup covers into engagement with the said oil receiving device to wipe oil therefrom and direct it into the cups.

8. In a conveyer or the like, the combination with the endless chains each comprising links, pivot pins connecting the links, and rail engaging wheels rotatably mounted on said pins, said pins being formed with longitudinal passages and radial passages leading therefrom to the bearing surfaces of the pins, oil cups carried by said chain pins and adapted to feed oil to the passages thereof, each cup having a normally closed cover, oil reservoirs mounted adjacent the paths of travel of the chains, and means for automatically opening the covers of the oil cups as the latter pass the said reservoirs to receive oil therefrom.

9. In a lubricating system, the combination of a moving mechanism, a lubricant receptacle carried by said mechanism and having a discharge passage in communication with the bearing surfaces of said mechanism, said receptacle being normally fully closed except for said discharge passage, and means disposed adjacent the path of the moving mechanism for intermittently opening the receptacle and introducing lubricant into it.

10. In a lubricating system, the combination of a moving mechanism, a lubricant receptacle carried by said mechanism and having a discharge passage in communication with the bearing surfaces of said mechanism, said receptacle being normally fully closed except for said discharge passage, and means operable by the movement of the mechanism for intermittently opening the receptacle and introducing lubricant into it.

11. In a conveyer or the like, the combination with a chain, of lubricant receptacles carried by the chain, said receptacles having discharge passages leading to the bearing surfaces of said chain and being normally fully closed except for said discharge passages, and means disposed adjacent the path of the chain for intermittently opening the receptacles and introducing lubricant into them.

12. In a conveyer or the like, the combination with a chain, of lubricant receptacles carried by the chain, said receptacles having discharge passages leading to the bearing surfaces of the chain and being normally closed except for said discharge passages, and means operable by the movement of the chain for intermittently opening said receptacles and introducing lubricant into them.

In testimony whereof I affix my signature, in presence of two witnesses.

ARCHIBALD W. F. STECKEL.

Witnesses:
H. B. ALEXANDER,
WM. B. WILSON.

---

Copies of this patent may be obtained for five cents each, by addressing the "Commissioner of Patents. Washington, D. C."